(12) United States Patent
Martinez

(10) Patent No.: US 7,971,521 B2
(45) Date of Patent: Jul. 5, 2011

(54) FLATBREAD MAKER

(76) Inventor: Marvin G. Martinez, Westminster, CO (US)

( * ) Notice: Subject to any disclaimer, the term of this patent is extended or adjusted under 35 U.S.C. 154(b) by 708 days.

(21) Appl. No.: 12/014,334

(22) Filed: Jan. 15, 2008

(65) Prior Publication Data

US 2009/0178574 A1  Jul. 16, 2009

(51) Int. Cl.
 A47J 37/08  (2006.01)
 A47J 37/06  (2006.01)
 A47J 37/00  (2006.01)

(52) U.S. Cl. ............... 99/349; 99/353; 99/379

(58) Field of Classification Search ............ 99/349, 99/353, 379; 100/92, 305; 425/394
See application file for complete search history.

(56) References Cited

U.S. PATENT DOCUMENTS

| | | | | |
|---|---|---|---|---|
| 2,597,592 A * | 5/1952 | Minder | .......... | 100/219 |
| 2,681,001 A * | 6/1954 | Smith | .......... | 99/402 |
| 3,880,064 A * | 4/1975 | Martinez | .......... | 99/349 |
| 5,964,451 A * | 10/1999 | Sudheimer | .......... | 254/132 |
| 6,027,153 A * | 2/2000 | Marshall | .......... | 294/55 |
| 6,089,144 A * | 7/2000 | Garber et al. | .......... | 99/331 |
| 6,439,108 B1 * | 8/2002 | Wu | .......... | 99/349 |

* cited by examiner

*Primary Examiner* — Reginald L Alexander
(74) *Attorney, Agent, or Firm* — Jensen & Puntigam, P.S.

(57) ABSTRACT

A handle and latch assembly for a flatbread maker, which includes a handle rotatably mounted to an upper heating plate of the flatbread maker. A roller plate extends downward from the handle, adjacent the peripheral edge of the upper plate, the roller plate having a roller rotatably mounted near the lower end thereof. A latch member is secured to a lower portion of the body of the flatbread maker, beneath the lower heating plate. The latch member has a lower surface configuration which includes at least two curved or notched areas therein. The handle is pressed downwardly so that is the roller engages one or the other of the two curved areas, flatbreads with two different thicknesses are produced.

20 Claims, 4 Drawing Sheets

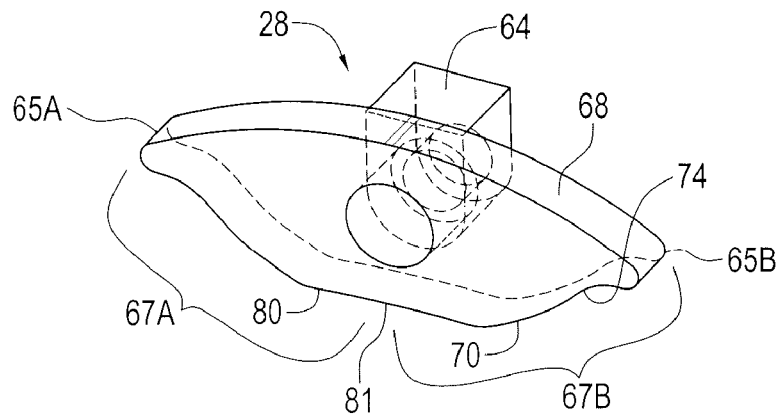
FIG. 4
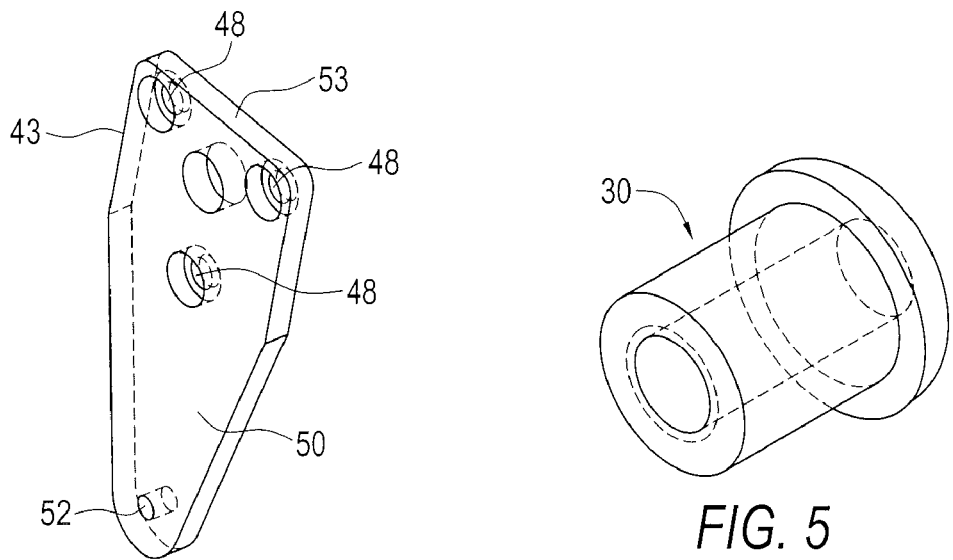
FIG. 6
FIG. 5
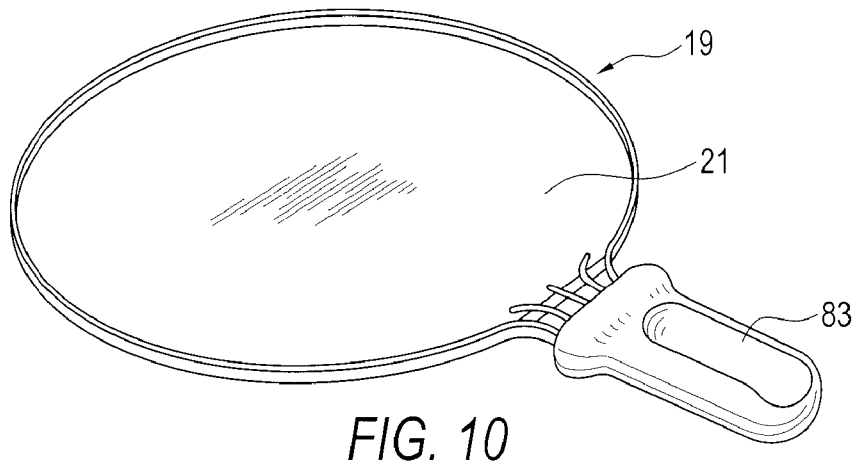
FIG. 10

FLATBREAD MAKER

TECHNICAL FIELD

This invention relates generally to flatbread makers, and more particularly concerns the portion of a flatbread maker which controls the pressing of a dough mass into a flatbread of desired thickness and configuration.

BACKGROUND OF THE INVENTION

Flatbread makers, including for instance traditional tortilla makers, typically include an assembly for flattening a commercially prepared or home-made dough mass, typically in the form of a ball, into a round flatbread of desired thickness and size. Typically, the thicker flatbreads are focaccia, pita bread, pizza and similar items, while thinner flatbreads are, for instance, tortillas, lefse or crepes. Some flatbread makers also include the capability of cooking the flatbread after it has been pressed into the desired thickness. Two examples of such devices are shown in U.S. Pat. No. 4,664,025 and U.S. Pat. No. 6,089,144.

Typically, operating such flatbread makers to produce the desired flatbreads prior to cooking requires at least some degree of training or experience as well as strength and dexterity. Many individuals do not have the training or experience and others lack sufficient strength and/or dexterity to operate the traditional flatbread makers in order to press a dough mass into a flatbread. Obtaining a consistently round flatbread, with no frayed edges, with a desired thickness, is often difficult, and depends upon accurate guesswork as well as a significant amount of practice.

Accordingly, it would be desirable to have a user-friendly, dependable flatbread maker with a pressing mechanism which with minimal training or practice can produce flatbreads of desired thickness and size reliably and quickly, and further is easy and convenient to use, even for those individuals with impaired strength and dexterity. Further, it would be desirable to have a flatbread maker with a pressing mechanism which is ergonomically designed, having a secure, non-slick grip portion which can be used ambidextrously, and which can be locked in a particular pressing position, allowing the user to be away from the appliance for a time.

SUMMARY OF THE INVENTION

Accordingly, a handle and latch mechanism for a flatbread maker is disclosed, comprising: a handle, rotatably mounted to an upper plate of the flatbread maker, the upper plate being pivotable downwardly toward the fixed lower plate by an action on the handle; a roller assembly extending downwardly from the handle, the roller assembly including a roller element; and a latch member secured to a lower portion of the flatbread maker, the latch member having a surface configuration which has at least two areas therealong for receiving the roller element as the handle moves the upper plate downwardly, pressing a dough mass present on a spatula or other member positioned on the lower plate, or on the lower plate, wherein the at least two areas of the latch member surface configuration result in at least two different thicknesses of a flatbread when the roller element engages said two areas, respectively.

Further, a flatbread maker is disclosed comprising: a housing, having an open center section; an upper plate pivotally mounted to the housing; a fixed lower plate; a handle rotatably mounted to the upper plate, the upper plate being pivotable downwardly toward the fixed lower plate by action on the handle; a roller assembly extending downwardly from the handle, the roller assembly including a roller element; and a latch member secured to a lower portion of the flatbread maker, the latch member having a surface configuration which has at least two areas therealong for receiving the roller element is the handle moves the upper plate downwardly, pressing a dough mass present on a spatula or other member positioned on the lower plate, wherein the at least two areas of the latch member surface configuration result in at least two different thicknesses of a flatbread when the roller element engages said two areas, respectively.

BRIEF DESCRIPTION OF THE DRAWINGS

FIG. 4 is a perspective view of a latch bracket portion of FIG. 3.

FIG. 5 is a perspective view of a roller axle portion of FIG. 3.

FIG. 6 is a perspective view of a roller plate portion of FIG. 3.

FIG. 10 is a perspective view of a flatbread spatula used as part of the flatbread maker of FIGS. 1-9.

BEST MODE FOR CARRYING OUT THE INVENTION

Figure 1:
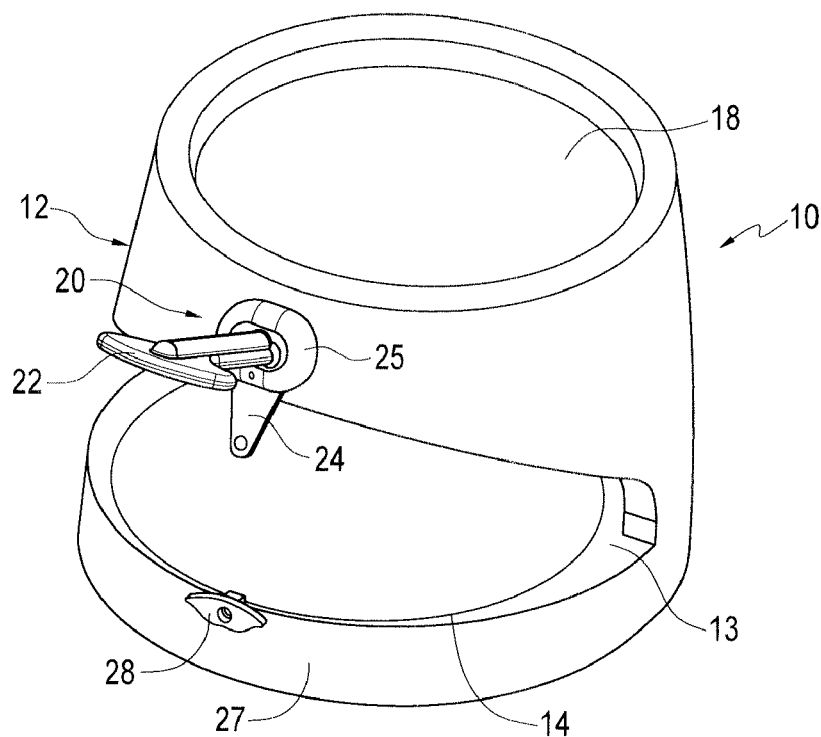
FIG. 1 is a perspective view of a flatbread maker, including the flatbread pressing assembly, disclosed herein, in a non-pressing condition.
Figure 2:
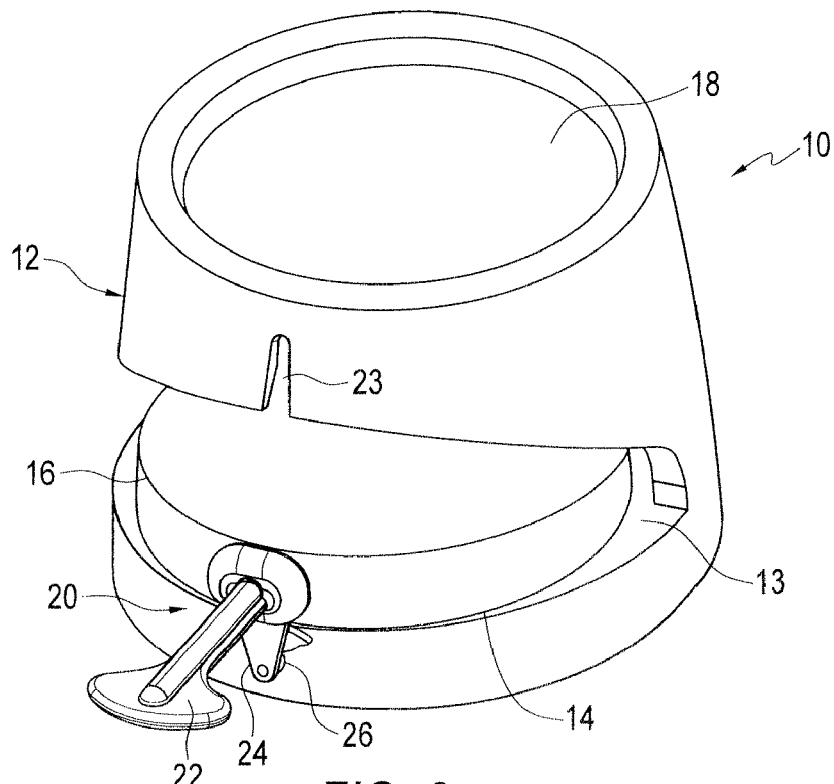
FIG. 2 is a perspective view showing the flatbread maker of FIG. 1 in a pressing condition relative to a spatula shown in FIG. 10.

Referring now particularly to FIGS. 1 and 2, a flatbread maker is shown generally at 10, which includes a housing portion 12. Housing 12 has an opening 13 defined by upper and lower edges 15 and 17. Mounted within housing 12 is a fixed lower plate 14, which is heated, and an tipper plate 16 (not shown in FIG. 1) which is also heated and is rotatably mounted at a rear edge to the housing, so that in operation, the upper plate 16 is rotated downwardly to come close to lower plate 14, which has a spatula 19 (FIG. 10) positioned thereon, for pressing a dough mass (usually in the form of a ball) into a flatbread of desired form, size and thickness, on an upper surface 21 of the spatula, where it is initially heated/pre-cooked by plates 14 and 16. The present flatbread maker can accommodate various kinds of dough. Flatbread maker 10 also has a heated top griddle plate 18 on which the pressed flatbread is final cooked for consumption. Alternatively, the plates 14 and 16 could be used to cook the pressed flatbread.

Also shown in FIGS. 1 and 2 is a handle and latching mechanism 20, described in detail below and now described generally. The handle and latch assembly 20 includes a handle 22 which is mounted to the peripheral edge of upper heating plate 16 and by which the upper plate is moved up and down. In the stowed position of upper plate 16, the proximal end of handle 22, between a base portion 25 of the handle and the peripheral edge of plate 16, is positioned in slot 23 in the housing, the slot 23 extending upwardly from upper edge 15 of opening 13, as shown most clearly in FIG. 3.

A roller plate 24 is secured to a rear face of base portion 25 of the handle. Extending rearwardly from the lower edge of roller plate 24 is a roller 26. A latch member 28 is mounted to a lower portion 27 of the housing, slightly below the lower heated plate 14. Latch member 28 has a surface configured such that contact between roller 26 and said surface at particular locations along the latch member surface results in flatbreads of various selected forms, sizes and thicknesses, including soft, hard or with imprint texture, round or other geometric forms.

Figure 3:
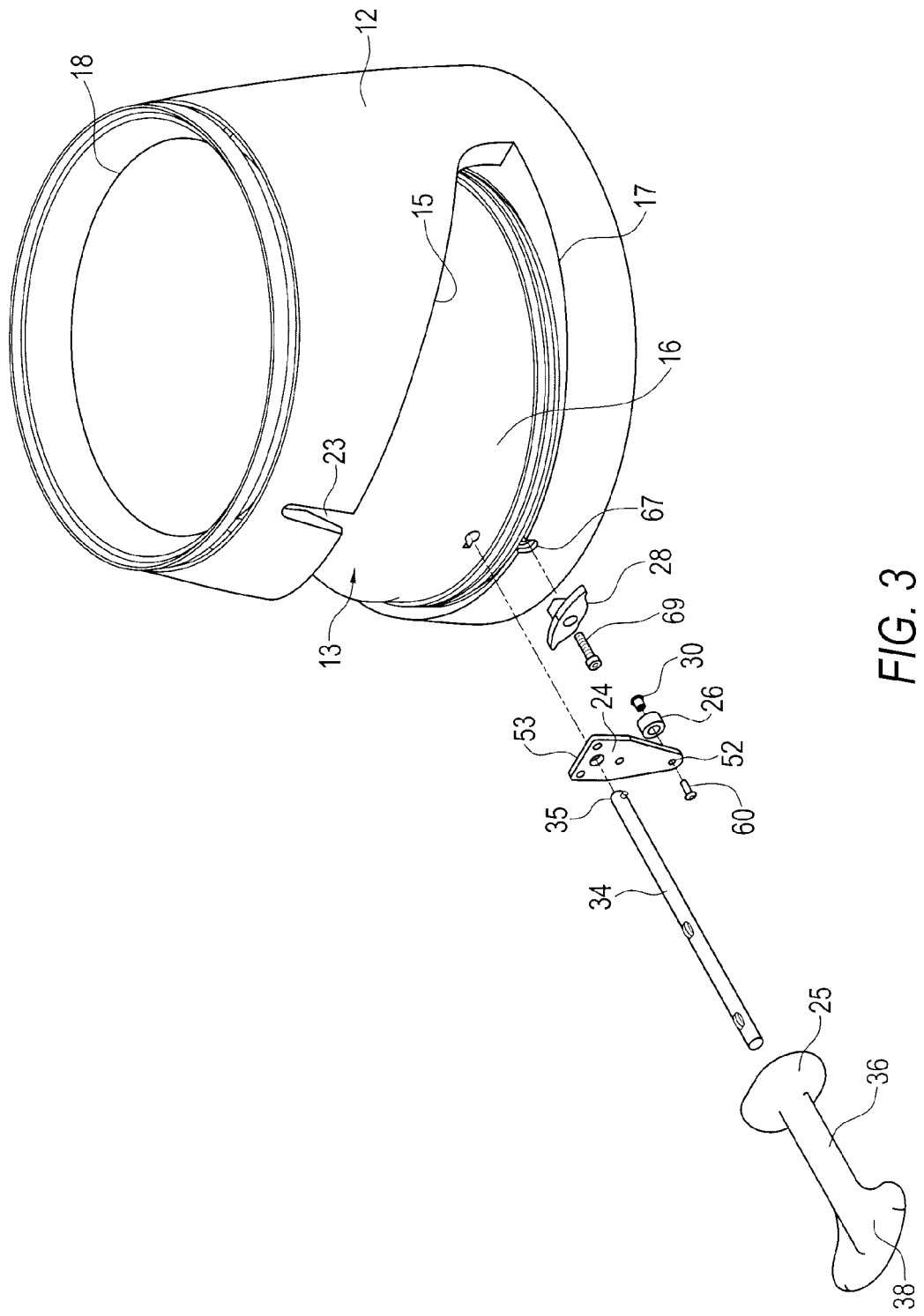
FIG. 3 is an exploded view of a handle and latching mechanism for the flatbread maker of FIGS. 1 and 2.
Figure 7:
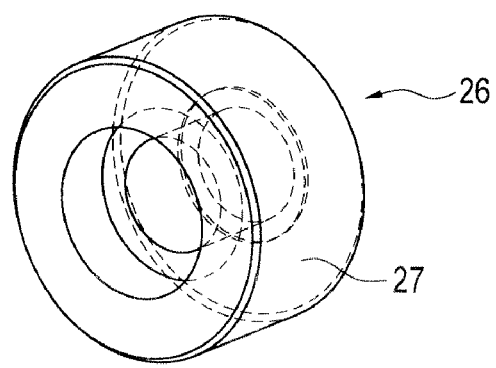
FIG. 7 is a perspective view of a roller portion of FIG. 3.
Figure 8:
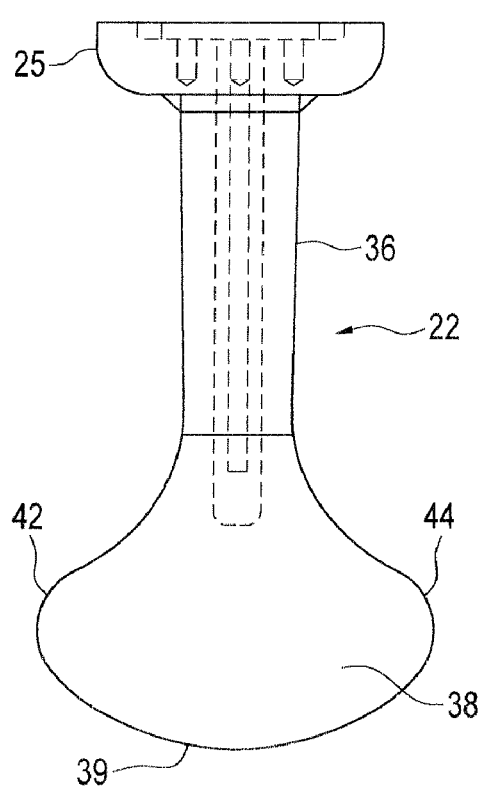
FIG. 8 is a top view of a handle portion of FIG. 3.
Figure 9:
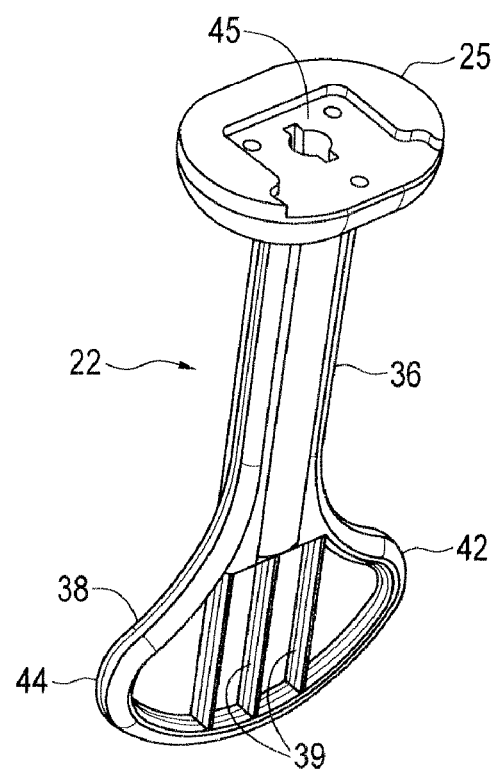
FIG. 9 is a perspective view of the handle portion of FIG. 3, from the bottom thereof.

More particularly, referring now to FIGS. 3, 8 and 9, handle 22 is shown in more detail. As discussed above, handle 22 includes base portion 25 which is positioned close to the peripheral edge of upper heated plate 16. Base portion 25 is approximately 2 inches long (across) and 1.7 inches wide (high). Handle 22 is secured to heated plate 16 by a locking rod 34, the proximal end 35 of which fits into a mating opening in heated plate 16. Handle 22 and locking rod 34 are rotatable through an angle of approximately 270° in the embodiment shown. Extending from base portion 25 is an elongated section 36, which at the distal end thereof flares out into an end grasping portion 38, which is configured to conveniently and ergonomically fit into the hand of the user, allowing for a strong grip on the handle and ambidextrous use. The total length of the handle is approximately 5.5 inches, with elongated section 36 being approximately 2.7 inches in length and approximately 0.8 inches wide, with a thickness of approximately 0.5 inches.

End portion 38, at the other end of handle 22 from base portion 25, has a curved outer edge 39, which curves inwardly to mate with elongated section 36 from opposing edge points 42 and 44, which are separated by approximately 3 inches. The end portion 38 is approximately 0.31 inches thick. The basic configuration of the handle, particularly end portion 38, permits the user to easily grasp the handle with a strong, secure grip and to rotate it in either direction. The flared design of end portion 38 provides the user with the ability to rotate the handle without significant effort. End portion 38 also has three spaced longitudinal ribs 39 on its underside which provide adjacent spaces for the fingertips of the user. Handle 22 is made from plastic with rod 34 being of stainless steel in the embodiment shown.

Attached to base portion 25 is roller plate 24. Roller plate 24 is shown in detail in FIG. 6. It includes an upper portion 43 which is generally rectangular and fits into a cut-out region 45 in base portion 25 of the handle. Roller plate 24 is attached by screws or the like to the base portion through three spaced openings 48-48. Extending downwardly from the upper rectangular portion 43 is a triangular portion 50, at the lower curved end of which is an opening 52. The length of the roller plate from top edge 53 to opening 52 is approximately 2.38 inches. Roller plate 24, like rod 34, is made from stainless steel in the embodiment shown.

Rotatably secured to the lower end of roller plate 24 is roller 26. Roller 26 has a circular exterior surface 27 with an external diameter of approximately 0.5 inches and a thickness of approximately 0.3 inches in the embodiment shown, and is fully rotatable about a roller axle 30 (FIG. 5). Roller axle 30 is secured to the roller plate 24 by means of a threaded bolt 60 which extends through opening 52 in the roller plate into axle 30.

Thus, handle 22 and roller plate 24 are rotatable through a selected angle relative to upper plate 16, while roller 26 rotates about roller axle 30 at the lower end of the roller plate 24.

The latch bracket 28 as indicated above is secured to the lower portion of housing 12, just below lower edge 17 of housing opening 13. Latch bracket 28 is shown in FIG. 4. In the embodiment shown, latch bracket 28 is approximately 1.75 inches from side edge 65A to opposing side edge 65B, and has an upper surface 68 and a lower surface 70 which extend, respectively, between the two side edges. The latch has a varying height and a thickness of approximately 0.19 inches. The latch has a mounting portion 64 which fits into an opening 67 in housing 12. A bolt 69 holds the latch bracket in place.

The upper and lower surfaces 68 and 70 are important in the operation of the handle and latching assembly 20. Upper surface 68 defines a continuous curve between side edges 65A and 65B. Lower surface 70 includes left and right-hand portions 67A and 67B which are minor images of each other in the embodiment shown. Both the right-hand and left-hand portions initially curve inwardly and downwardly from the respective side edges, in a slightly concave arrangement, defining a first curved or notched section 74 in each portion. The surface then continues to curve downwardly and inwardly at an angle of approximately 45°, in a slightly convex curve, until it reaches a straight bottom edge portion 80. At the midpoint of bottom edge portion 80 is a slightly concave section 81, which defines a second notched or curved section of the latch in the embodiment shown.

It should be understood that the latch can have other lower edge configurations providing different latch depths, with more than two notched sections, or there could be just one notched section. Each of the notched sections 74 and 81 represents a particular thickness of a resulting flatbread, by causing plate 16 to be moved down a selected distance onto the dough mass and flattening it on the spatula positioned on heated plate 14, when the roller engages one of the two notched sections. When the handle has been pressed down sufficiently that the roller 26 is in the first notch 74, in either the left-hand or right-hand portion, a relatively thick flatbread, such as focaccia or pita, results, while when the handle has been pressed sufficiently that the roller is in the second notched section 81, a thinner flatbread results, such as is suitable for tortillas or sandwich wraps. In the arrangement shown, the handle can be pressed down even further, such that the roller 26 is below the lower surface (edge 81) of the latch, producing an even thinner flatbread, such as crepes.

In operation of the machine, the upper heating plate 16 with its attached handle is initially in the upward (stowed) position shown in FIG. 1. A dough mass, such as a ball, is first placed on the spatula 19, which is positioned on heating plate 14. The handle and the upper plate 16 are moved downwardly until contact is made by the roller 26 with the upper surface 68 of the latch bracket 28. At this point, the handle is rotated slightly either counterclockwise or clockwise, allowing the handle, upon further downward pressure, to further rotate, until the roller moves beyond either side edge of the latch; and then upon further pressure and counter-rotation, moves to contact the lower surface 70 of the latch. The rotation of the handle, to some extent, occurs somewhat automatically, with downward pressure on the handle, although a slight rotation of the handle by the user aids in the roller following the upper surface of the latch.

As indicated above, when roller 26 has moved beyond one or the other of side edges 65A or 65B of the latch and then begins to move along the lower surface 70, the roller will first encounter notch section 74 in either portion 67A or 67B of the latch. At this point, the dough ball has been pressed to a first thickness, size and form. When this pressing/forming of the flatbread is done, handle 22 is rotated and moved upwardly so that the roller moves out of contact with surface 70 and away from the latch, releasing the upper heating plate from the pressed flatbread. The flatbread at that point is typically precooked by the heating plates 14 and 16, which are typically maintained at a temperature sufficient to initially heat and precook the flatbread. Most flatbreads are then moved to the top griddle plate 18 for final cooking. The flatbread is moved by removing spatula 19 by handle 83 with the pressed flatbread thereon and moving it to the vicinity of the top griddle plate 18. The user removes the flatbread from the spatula and places it on the griddle plate 18, which is kept at a temperature in the range of 100°-425° for final cooking. In the embodiment shown, three temperature selections are possible with a switch (not shown) within the range, to give different heating effects, at the lower and upper ends of the range and also at an approximate midpoint.

If a thinner flatbread is desired, further downward pressure on the handle will result in roller 28 moving further along the lower edge of the latch bracket until it reaches notched section 81. At this point, the thickness of the flatbread has been reduced to that of a tortillas sandwich wrap or similar flatbread. The flatbread can be final cooked in this position by the upper and lower heating plates 14 and 16, if a wafer or cracker-type flatbread is desired, and when done, the handle can be released from the latch bracket and the wafer/cracker removed, or the flatbread can be just precooked between the two plates 14 and 16 and then transferred to the top griddle plate for final cooking.

In the embodiment shown, the handle can be pushed still further downward a slight distance to produce an even thinner flatbread, such as for crepes.

As indicated above, other notched sections, surface contours or configurations of the lower latch surface can be used in order to provide a series of different flatbread thicknesses, sizes, designs and/or forms. The two notched sections 74 and 81 described are for illustration only.

The above handle and latch assembly 20 provides the user the ability to reliably produce flatbreads of different textures, sizes, designs, forms and thicknesses in a controlled manner. The structural arrangement also allows the strength-impaired to more readily press out and form such flatbreads. Further, the arrangement of the mechanism readily adapts to right or left-handed users.

With the pressing capability of the present embodiment, a design embossed on the lower surface of the upper plate will produce an imprint, texture or design on the flatbread.

Although a preferred embodiment of the invention has been disclosed here for the purposes of illustration, it should be understood that various changes, modifications and substitutions may be incorporated in the embodiment without departing from the spirit of the invention, which is defined by the claims which follow.

What is claimed is:

1. A handle and latch mechanism for a flatbread maker, comprising:
    a handle, rotatably mounted to an upper plate of the flatbread maker, the upper plate being pivotable downwardly toward a fixed lower plate by a user action on the handle;
    a roller assembly extending downwardly from the handle, the roller assembly including a support member which is connected to the handle and extends downwardly therefrom, the roller assembly including a roller element which is rotatably secured to the support member; and
    a latch member secured to a lower portion of the flatbread maker, the latch member having a surface configuration which has at least two areas therealong for receiving the roller element as the handle moves the upper plate downwardly, pressing a dough mass present on a spatula or other member positioned on the lower plate, or on the lower plate, wherein the at least two areas of the latch member surface configuration result in at least two different thicknesses of a flatbread when the roller element engages said two areas, respectively.

2. The mechanism of claim 1, arranged and configured so as to provide control over texture, size and form of the flatbread.

3. The mechanism of claim 1, wherein the support member is a roller plate and wherein the roller element is rotatably secured to a lower end of the roller plate.

4. The mechanism of claim 1, wherein said latch member surface is a lower surface.

5. The mechanism of claim 4, wherein an upper surface of the latch member is convexly curved so that as the handle is moved toward the latch member and rotated slightly, the roller element contacts the upper surface of the latch member, moves and is guided along the upper surface to an end point thereof and then into contact with the lower surface of the latch member as the handle is counter-rotated and pressed further downwardly.

6. The mechanism of claim 5, wherein the upper and lower surfaces of the latch member meet at respective opposing end points thereof.

7. The mechanism of claim 5, wherein one side portion of the latch member is a mirror image of the other side.

8. The mechanism of claim 6, wherein the first thickness area is located near the end points of the latch member, while the second thickness area is located in a mid-region of the lower surface of the latch member.

9. The mechanism of claim 1, wherein the handle includes an elongated portion extending outwardly from the upper plate and a gripping portion at the distal end of the elongated portion having a flared, curved configuration designed to fit in the palm of a user's hand.

10. The mechanism of claim 3, wherein the roller plate includes a triangular portion which extends downward from the elongated portion of the handle portion and wherein the roller is mounted for rotation about an axle member which is secured to a lower end of the triangular portion.

11. The mechanism of claim 1, wherein the mechanism is configured to permit further downward pressure on the handle, such that the roller element is below the lowest of the two areas, resulting in a flatbread which is thinner than the two thicknesses.

12. The mechanism of claim 1, wherein the upper and lower plates are heated to provide a precooking of the flatbread and wherein the flatbread maker includes a top griddle plate for final cooking of the flatbread.

13. A flatbread maker, comprising:
    a housing, having an open center section;
    an upper plate pivotally mounted to the housing;
    a fixed lower plate;
    a handle rotatably mounted to the upper plate, the upper plate being pivotable downwardly toward the fixed lower plate by a user action on the handle;
    a roller assembly extending downwardly from the handle, the roller assembly including a support member connected to the handle and extending downwardly therefrom, the roller assembly including a roller element rotatably secured to the support member; and
    a latch member secured to a lower portion of the flatbread maker, the latch member having a surface configuration which has at least two areas therealong for receiving the roller element as the handle moves the upper plate downwardly, pressing a dough mass present on a spatula or other member positioned on the lower plate, wherein the at least two areas of the latch member surface configuration result in at least two different thicknesses of a flatbread when the roller element engages said two areas, respectively.

14. The flatbread maker of claim 13, arranged and configured so as to provide control over texture, size and form of the flatbread.

15. The flatbread maker of claim 13, wherein the support member is a roller plate and wherein the roller element is rotatably secured to a lower end of the roller plate.

16. The flatbread maker of claim 15, wherein an upper surface of the latch member is convexly curved so that as the handle is moved toward the latch member and rotated slightly, the roller element contacts the upper surface of the latch member, moves and is guided along the upper surface to an end point thereof and then into contact with the lower surface of the latch member as the handle is counter-rotated and pressed further downwardly.

17. The flatbread maker of claim 15, wherein one side portion of the latch member is a mirror image of the other side.

18. The flatbread maker of claim 13, wherein the handle includes an elongated portion extending outwardly from the upper plate and a gripping portion at the distal end of the elongated portion having a flared, curved configuration designed to fit in the palm of a user's hand.

19. The flatbread maker of claim 13, wherein the mechanism is configured to permit further downward pressure on the handle, such that the roller element is below the lowest of the two areas, resulting in a flatbread which is thinner than the two thicknesses.

20. The flatbread maker of claim 13, wherein the upper and lower plates are heated to provide a precooking of the flatbread and wherein the flatbread maker includes a top griddle plate for final cooking of the flatbread.

* * * * *